United States Patent
Wassenhoven

[11] Patent Number: 5,950,414
[45] Date of Patent: Sep. 14, 1999

[54] BRAKE FOR AN OPEN-END SPINNING ROTOR

[75] Inventor: Heinz-Georg Wassenhoven, Moenchengladbach, Germany

[73] Assignee: W. Schlafhorst AG & Co., Moenchengladbach, Germany

[21] Appl. No.: 09/136,113

[22] Filed: Aug. 18, 1998

[30] Foreign Application Priority Data

Aug. 19, 1997 [DE] Germany ............... 197 35 973

[51] Int. Cl.⁶ ............... D01H 13/18; D01H 4/00
[52] U.S. Cl. ............... 57/406; 57/78; 57/88
[58] Field of Search ............... 57/404, 406, 407, 57/414, 78, 88

[56] References Cited

U.S. PATENT DOCUMENTS

| | | | |
|---|---|---|---|
| 4,706,450 | 11/1987 | Feuchter et al. | 57/88 |
| 4,785,620 | 11/1988 | Feuchter | 57/406 |
| 4,989,401 | 2/1991 | Feuchter et al. | 57/88 |

FOREIGN PATENT DOCUMENTS

| | | |
|---|---|---|
| 1 912 477 | 10/1970 | Germany . |
| 21 41 276 B2 | 9/1976 | Germany . |
| 36 30 256 A1 | 3/1988 | Germany . |
| 38 20 328 C2 | 12/1993 | Germany . |
| 55-14339 | 1/1980 | Japan . |

*Primary Examiner*—William Stryjewski
*Attorney, Agent, or Firm*—Kennedy Covington Lobdell & Hickman, LLP

[57] ABSTRACT

A rotor brake (8) has a brake element holder (22) releasably fixed in place on a jaw-like brake lever (9, 10) and a dovetailed retaining slot (26) on its end. A brake element (30), which in cross section (A) has the shape of an equilateral triangle, is held in this dovetailed retaining slot (26). The brake element (30) has three brake surfaces (31, 31', 31"), which can be used alternately.

5 Claims, 2 Drawing Sheets

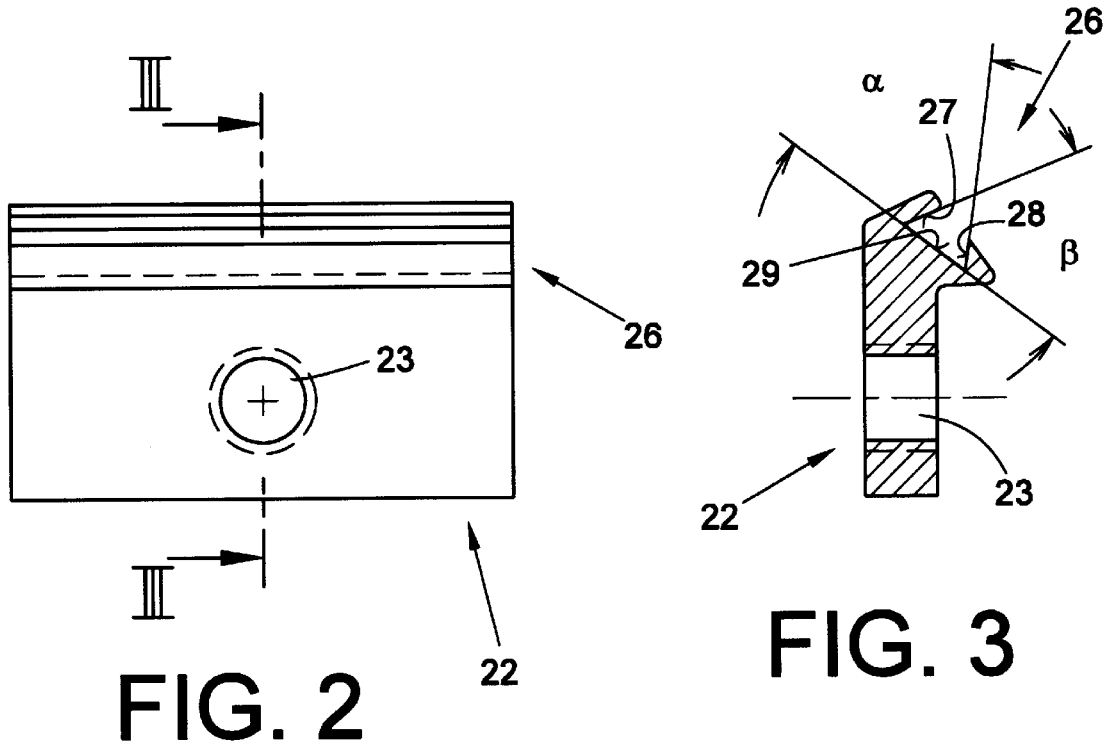
FIG. 2
FIG. 3
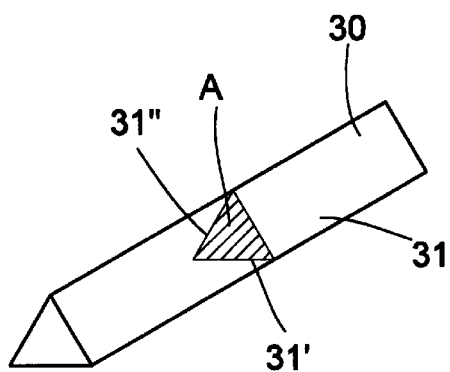
FIG. 4

BRAKE FOR AN OPEN-END SPINNING ROTOR

FIELD OF THE INVENTION

The present invention relates to a brake for an open-end spinning rotor having a rotor shaft rotatably seated in bearing wedges of a supporting disk bearing, and more particularly relates to a brake having at least one brake lever which can be displaced in the direction toward the rotor shaft and an exchangeably arranged brake element.

BACKGROUND OF THE INVENTION

Open-end rotor spinning arrangements with connectable rotor brakes are known in various embodiments. For example, a rotor brake is described in German Patent Publication DE 36 20 256 A1, which has a brake lever which can be placed from below against the rotor shaft, a brake element, and two hold-down devices resting from above on the rotor shaft with brake element-like blocks. The blocks of the hold-down devices, which have a different coefficient of friction than the brake element arranged on the brake lever, are arranged so they can be replaced.

A rotor brake is furthermore known from German Patent Publication DE 38 20 328 C2, which has symmetrically-arranged mirror-image jaw elements. At their end, the jaw elements respectively have a replaceable brake element. When the brake is actuated, the brake elements are simultaneously placed against the rotor shaft and thereby brake to a stop the spinning rotor, which rotates at high speed (rpm).

However, the known rotor brakes have the disadvantage that the service life of such brakes is relatively limited because of the comparatively high wear on the brake elements, as well as their structure. That is, with the known rotor brakes the brake elements can only be utilized at a relatively low percentage, since even with a relatively slight wear of the brake elements there is the danger that the function of the brake is impaired.

In addition, the brake elements of the known rotor brakes are often fixedly attached to the brake levers, so that, when renewing the brake elements because of wear, it is necessary as a rule to replace the entire brake lever.

Although the brake elements are replaceably fixed on the brake levers of the rotor brake in accordance with German Patent Publication DE 38 20 328 C2, the service life of the brake elements is relatively limited as described above because of the selected design, which leads to an increased bending stress of the covers.

SUMMARY OF THE INVENTION

In view of the above mentioned prior art, it is an object of the invention to improve the known rotor brakes.

In accordance with the invention, this object is attained by providing a brake for an open-end spinning rotor having a rotor shaft rotatably seated in bearing wedges of a supporting disk bearing, wherein the brake comprises at least one brake lever movable toward and away from the rotor shaft, a brake element holder releasably affixed to the brake lever, the brake element holder having a dovetailed retaining slot, and a brake element arranged exchangably in the dovetailed retaining slot.

A rotor brake embodied in accordance with the present invention has the advantage that the brake element holder, which can be fixed in place on the brake lever, can receive in a dovetailed retaining slot a brake element having several brake surfaces of the same type, which can be employed one after the other. It is possible in this manner to clearly extend the service life of the brake elements of such rotor brakes. Thus, the brake elements, which can be fixed in place in a dovetailed retaining slot of the brake element holder, can be simply turned after abrasion-related wear and re-used in a new installed position.

The brake element preferably has the cross-sectional shape of an equilateral triangle. Such a shape assures in a simple manner that the brake element is dependably held in any of its possible installed positions in the appropriate dovetailed retaining slot of the brake element holder. On the other hand, such an embodiment leads to a clear increase of the service life of the brake elements since all three outside surfaces of the brake element can be used one after the other as the brake surface.

In a preferred embodiment, the dovetailed retaining slot has a bottom guide face, which is adjoined on both sides by a lateral guide face at an angle of approximately 60°. The width of the lateral guide faces in this case is advantageously selected to assure that the brake element is still securely fixed in place in the dovetailed retaining slot, even if one or two of its brake surfaces are already worn out.

Preferably, the brake element holder is made of steel, which offers advantages, in particular in view of its stability and material costs. However, it is also possible to make the brake element holder of another material, for example aluminum. In this case the brake element holders are advantageously produced as injection die cast or die cast elements which can be advantageous, particularly with a large number of pieces.

Further details of the invention will be understood from an exemplary embodiment, which will be explained below with reference to the accompanying drawings.

BRIEF DESCRIPTION OF THE DRAWINGS

FIG. 2 is a side elevational view of the brake element holder in accordance with the present invention, FIG. 3 is a cross-sectional view of the brake element holder of FIG. 2 taken along the section line III—III thereof, and FIG. 4 is a perspective view of the brake element of FIG. 1 depicting its ability to be used on alternate sides.

DETAILED DESCRIPTION OF THE PREFERRED EMBODIMENT

Figure 1:
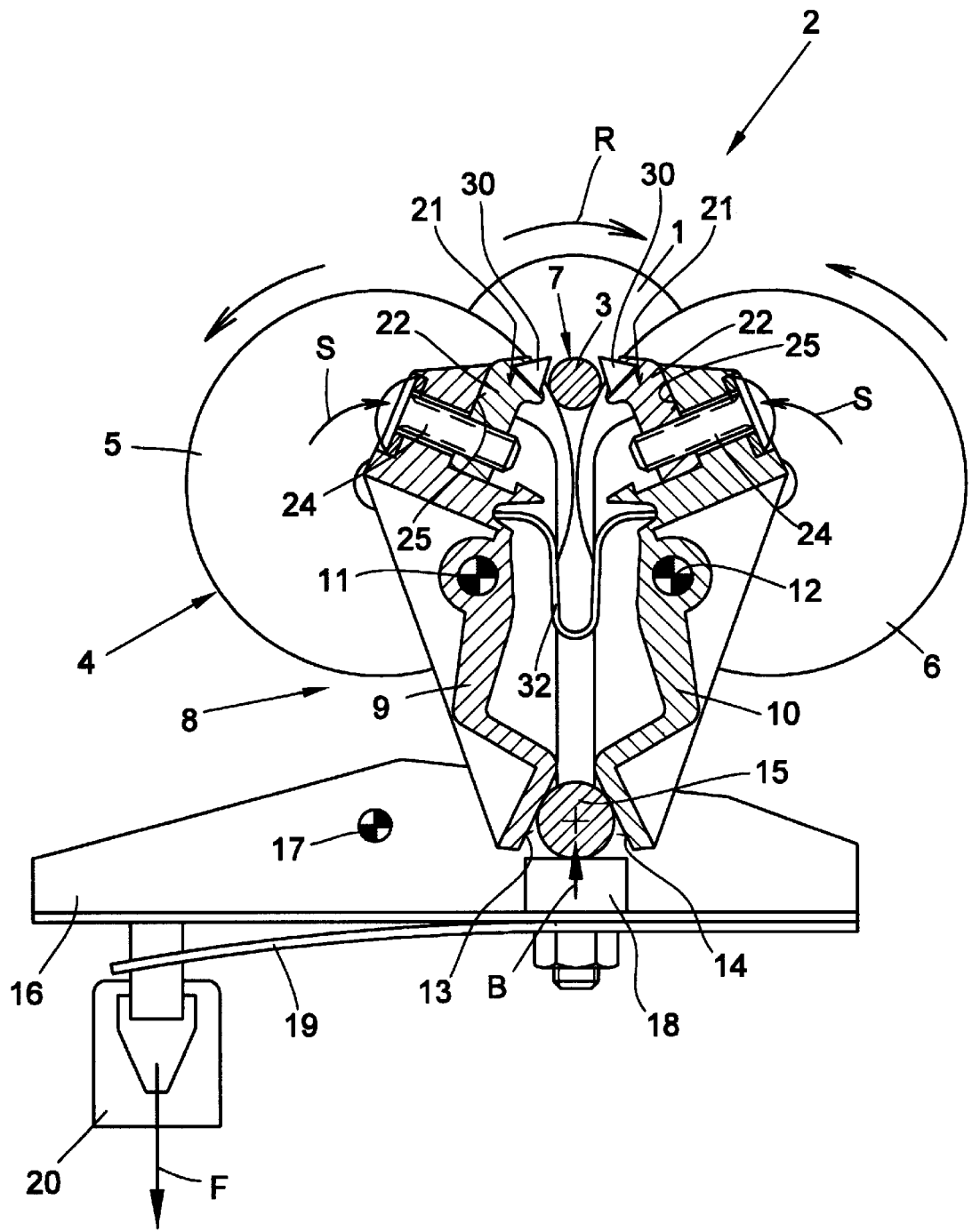
FIG. 1 is a end elevational view, partially in section, of an open-end rotor spinning arrangement taken axially with respect to the spinning rotor, showing a brake element holder in accordance with the present invention utilizing a brake element which can be used on alternate sides.

Referring now to the accompanying drawings and initially to FIG. 1, a spinning rotor assembly 2 has a spinning cup 1 mounted on a rotor shaft 3 which is supported in a customary manner in the bearing formed by a supporting disk bearing arrangement 4. FIG. 1 depicts the two front supporting disks 5, 6, of such a supporting disk bearing arrangement 4, as well as the bearing wedge area 7 defined between them.

As indicated, a jaw-like rotor brake 8 is associated with the rotor shaft 3, and provides jaw elements embodied as braking levers 9, 10. The braking levers 9, 10, are seated on respective pivot shafts 11, 12, for a limited degree of pivotal movement, and have bearing portions 21 on their respective ends for the releasable fixation of brake element holders 22.

On their opposite ends, the brake levers 9, 10, have sliding surfaces 13, 14 which, in the installed position as represented in FIG. 1, converge toward each other. A pressure element 15, preferably roller-shaped, is disposed between the sliding surfaces 13, 14 and can be displaced in the direction B to act on the sliding surfaces 13, 14 and, in turn, simultaneously act to pivot the braking levers 9, 10 to bring their respective opposite ends into braking relationship with the rotor shaft 3. A spring element 32 disposed between the brake levers 9, 10 normally maintains the levers 9, 10 spaced from the rotor shaft 3 in a non-braking disposition.

The pressure element 15 is fixed in place between the lateral walls of a U-shaped actuating lever 16, which in turn is seated in a known manner for limited pivoting around a pivot shaft 17. A pressure pillow 18 or the like is advantageously disposed underneath the movably seated pressure element 15 and is fixedly connected with the actuating lever 16.

In addition, a leaf spring 19 is fastened on the actuating lever 16, which has a carrier ring 20 on its end. An actuating gear (not represented) acts on this carrier ring 20. In case of service needed to the rotor assembly 2, the actuating gear is acted upon by a movable and automatically operating service unit.

As already indicated above, the brake levers 9 and 10 each have a bearing portion 21 on their ends located opposite the sliding surfaces 13 and 14, on which a brake element holder 22 can be releasably fixed in place. For this purpose, each brake element holder 22 has a threaded bore 23 and is fixed in place on a contact surface 25 of a respective bearing portion 21 by means of a threaded bolt 24 or the like.

A brake element holder 22 is represented in detail in FIGS. 2 and 3 and, in addition to the through-bore 23, has a dovetailed retaining slot 26 formed in its end. The dovetailed retaining slot 26 is defined by opposed lateral surfaces 27, 28 and a bottom connecting surface 29 oriented at angles $\alpha$ and $\beta$ of 600 with respect to one another.

A brake element 30 can be fixed in place in this dovetailed retaining slot 26. As shown in FIG. 4, the brake element preferably has the cross-sectional shape of an equilateral triangle (see cross section A). Thus, all outside surfaces of the brake element 30 are identical and each can be used as a brake surface 31, 31' and 31".

The device of the present invention functions as follows. If an event occurs at one of the multiple open-end spinning arrangements 1 of an open-end rotor spinning machine requiring service to the spinning arrangement, e.g., if opening one of the spinning units is required, it is first necessary to brake to a stop the respective spinning rotor 2, which rotates in the direction R at high speed (up to 150,000 rpm).

In this case braking of the spinning rotor 2 takes place by actuating the rotor brake 8 to pivot the brake levers 9 and 10 in a jaw-like manner to cause the brake elements 30 held by the brake element holders 22 to be placed against the rotor shaft 3. To accomplish such brake actuation, the leaf spring 19 is acted upon in the direction F by means of an appropriate actuating gear (not represented) arranged on the carrier 20. As a result, the leaf spring 19 pivots the actuating lever 16 to a limited degree about the bearing shaft 17 counterclockwise, whereby the pressure element 15 is raised in the direction B and pivots the brake levers 9 and 10 via the sliding surfaces 13, 14, in the direction S against the force of the spring element 32.

In the course of pivoting the braking levers 9 and 10, the brake surfaces 31 facing the rotor shaft 3 of the brake elements 30 arranged in the brake element holders 22 simultaneously engage against the rotor shaft 3 and effectively brake the spinning rotor 2 to a stop. At the end of the service operation the rotor brake 8 is released by lowering the pressure element 15 by means of the actuating lever 16, so that the spring element 32 pushes the brake levers 9 and 10, and respectively the brake elements 30 seated at the end of the brake element holders 22, away from the rotor shaft 3.

Over the course of time, braking of the high speed spinning rotor 2 leads to wear of the brake surfaces 31 of the brake elements 30 facing the rotor shaft 3, which ultimately can hamper the function of the rotor brake 8.

To reestablish normal braking function, it is only necessary in accordance with the invention to turn the brake elements 30 in the brake element holders 22 such that another brake surface 32 not previously used, for example the brake surface 31' or the brake surface 31", is oriented in the direction of the rotor shaft 3. To do so, it is merely necessary to turn the threaded bolt 24 out of the brake element holder 22, to lift the brake element holder 22 off the bearing portion 21 and to rotate the brake element by 120°. Following the rotation of the appropriate brake elements and the reinstallation of the associated brake element holder 22, full functioning of the brake is again available.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A brake for an open-end spinning rotor having a rotor shaft rotatably seated in a supporting disk bearing, the brake comprising at least one brake lever movable toward and away from the rotor shaft, a brake element holder releasably affixed to the brake lever, the brake element holder having a dovetailed retaining slot, and a brake element arranged exchangably in the dovetailed retaining slot.

2. The brake in accordance with claim 1, wherein the dovetailed retaining slot has a bottom surface and two adjoining lateral surfaces oriented at an angle to one another of approximately 60°.

3. The brake in accordance with claim 1, wherein the brake element holder is made of steel.

4. The brake in accordance with claim 1, wherein the brake element has a cross section in the shape of an equilateral triangle.

5. The brake in accordance with claims 4, wherein the three outside surfaces of the brake element are alternately usable as brake surfaces.

* * * * *